United States Patent [19]
Iwamura

[11] Patent Number: 5,544,263
[45] Date of Patent: Aug. 6, 1996

[54] MOTION VECTOR CALCULATION CIRCUIT, WITH FLATNESS-JUDGEMENT CIRCUITRY, THAT SELECTS A GENERATED MOTION VECTOR FOR OUTPUT IN ACCORDANCE WITH A FLATNESS JUDGEMENT RESULT

[75] Inventor: Ryuichi Iwamura, Tokyo, Japan

[73] Assignee: Sony Corporation, Tokyo, Japan

[21] Appl. No.: 285,497

[22] Filed: Aug. 3, 1994

Related U.S. Application Data

[63] Continuation of Ser. No. 11,360, Jan. 29, 1993, abandoned.

[30] Foreign Application Priority Data

Jan. 31, 1992 [JP] Japan ..................... 4-016830

[51] Int. Cl.⁶ ................................... G06K 9/00
[52] U.S. Cl. .................. 382/166; 382/107; 382/236; 348/402
[58] Field of Search ................. 348/699, 402, 348/416, 413, 154, 155, 402; 358/105, 36, 37; 382/236, 107, 164, 165, 166, 199, 236

[56] References Cited

U.S. PATENT DOCUMENTS

| 4,307,420 | 12/1981 | Ninomiya et al. | 358/136 |
|---|---|---|---|
| 4,630,307 | 12/1986 | Cok | 382/22 |
| 4,641,180 | 2/1987 | Richter | 358/105 |
| 4,775,888 | 10/1988 | Nakagawa et al. | 358/105 |
| 4,864,394 | 9/1989 | Gillard | 358/105 |
| 5,012,336 | 4/1991 | Gillard | 358/140 |
| 5,032,914 | 7/1991 | Fujita | 358/105 |
| 5,105,271 | 4/1992 | Nihara | 358/133 |
| 5,113,255 | 5/1992 | Nagata et al. | 358/136 |
| 5,122,876 | 6/1992 | Aoki | 358/105 |
| 5,208,662 | 5/1993 | Song | 358/105 |
| 5,251,028 | 10/1993 | Iu | 358/133 |
| 5,317,397 | 5/1994 | Odaka et al. | 348/416 |

Primary Examiner—Joseph Mancuso
Assistant Examiner—Jayanti K. Patel
Attorney, Agent, or Firm—Limbach & Limbach L.L.P.

[57] ABSTRACT

A circuit calculates motion vectors for use in compressing a motion picture signal. The motion picture signal is divided into portions, each portion representing a picture. The portions include a current portion representing a current picture. The current portion is subdivided into blocks. Each block represents a rectangular portion of the current picture, and includes a luminance signal, a first color signal, and a second color signal. A prediction picture circuit derives a prediction picture from the motion picture signal. A motion vector generating circuit generates a luminance motion vector, a first color motion vector, and a second color motion vector. The respective motion vectors are generated for a block by performing block matching between the luminance signal, the first color signal, and the second color signal of the block and signal components representing a block of the prediction picture corresponding to the block. A flatness judgment circuit judges whether the luminance signal component, the first color signal component, or the second color signal component of a matching prediction block of the prediction picture is not flat and, when one of the signal components is judged to be not flat, identifies the signal component determined to be not flat as a flatness judgment result. Finally, a motion vector selecting circuit selects the luminance motion vector, the first color motion vector, or the second color motion vector as the motion vector for the current block in response to the judgment result from the flatness judgment circuit.

12 Claims, 4 Drawing Sheets

5,544,263

1

MOTION VECTOR CALCULATION CIRCUIT, WITH FLATNESS-JUDGEMENT CIRCUITRY, THAT SELECTS A GENERATED MOTION VECTOR FOR OUTPUT IN ACCORDANCE WITH A FLATNESS JUDGEMENT RESULT

This is a continuation of application Ser. No. 08/011,360 filed on Jan. 29 1993, now abandoned

FIELD OF THE INVENTION

This invention relates to a motion vector detection circuit, and more particularly to an improvement to an interframe prediction coding circuit as used for compressing a motion picture signal.

BACKGROUND OF THE INVENTION

Prediction coding is a known technique for compressing an electronic signal representing a motion picture (a "motion picture signal") prior to transmitting or storing the signal. Prediction coding is a method of compressing the motion picture signal that takes advantage of the interframe correlation of the signal. Interframe prediction coding predicts the pixel values of the current picture from the pixel values of past pictures, determines a motion vector between portions of the current picture and corresponding portions of the past pictures, and, in response thereto, generates a prediction signal. FIG. 1 is a block diagram of a conventional interframe prediction coding circuit that generates such a prediction signal.

In the conventional interframe prediction coding circuit 10 shown in FIG. 1, the terminals 1 through 3 are respectively supplied with the luminance signal Y and a pair of color-difference signals, $C_B$ (=B−Y) and $C_R$ (=R−Y), all of which are components of the motion picture signal to be compressed prior to transmission or storage. These analog signal components are respectively converted by the analog to digital (A/D) converters 4, 5 and 6, into digital signals, which are fed into the buffer circuit 7. The buffer circuit 7 converts these digital signals into a serial signal which is arranged, for example, in the order in which the luminance signal Y of a given picture comes first, followed by the color-difference signal $C_B$, and then by the color-difference signal $C_R$.

The serially-arranged motion picture signal S1 is subtracted from the prediction signal S2 by the subtracter 13, and the resulting difference video signal S3 may be regarded as a prediction error signal S3. In the motion picture signal S1, the current picture is correlated with future or past pictures. Hence, the prediction error signal S3, which represents the differences between the motion picture signal S1 and prediction signal S2, which is derived from the pixels of one or more prediction pictures, i.e., future or past pictures, is small.

The prediction error signal S3 is supplied to the orthogonal transform circuit 14. In this embodiment, a discrete cosine transform (DCT) is used for the orthogonal transform. Alternatively, a Hadamard transform may be employed to perform the orthogonal transform. The transform coefficients S4 resulting from the orthogonal transform are sent to the quantizing circuit 15, where they are quantized.

The quantized transform coefficients S5 are subject to variable-length coding by the variable-length coding circuit 16. The resulting coded transform coefficients S6 are then multiplexed with their respective motion vectors by the multiplexer 17, and the resulting multiplexed signal is fed to the output terminal 19 via the output buffer 18. The resulting compressed motion picture signal S6 appearing at the output terminal 19 is then transmitted, stored, or processed further.

Generation of the prediction signal S2, used for deriving the prediction error signal S3, will now be described.

The quantized transform coefficients S5 are inversely quantized in the inverse quantizing circuit 21. The resulting transform coefficients S7 are then fed to the inverse discrete cosine transform circuit 22. The inverse discrete cosine transform circuit 22 inversely orthogonally transforms the transform coefficients S7 to provide a reconstructed prediction error signal S8, which has the same format as the output of the subtracter 13. The resulting reconstructed prediction error signal S8 is added to the prediction signal S2 by the adder 23, and the resulting reconstructed picture is fed from the adder 23 into the frame memory 24.

The video signal S9 representing one or more reconstructed pictures is fed from the frame memory 24 to the motion compensation circuit 25 and the motion vector detector 26. The prediction process is performed using the motion vectors generated by the motion vector detection circuit 26 using a block matching technique. Hence the prediction signal S2 is produced block by block.

Block matching is a technique which detects the degree of matching (degree of coincidence) between a search block (which may be as large as 8 pixels × 8 lines, for example) of the current picture, and a similarly-located, same-sized target block in the prediction picture. The location of the target block in the prediction picture is chosen to provide a maximum degree of coincidence between the search block and the target block. The displacement of the target block relative to the search block is then expressed as the motion vector for the search block.

The motion vector detection circuit 26 determines motion vectors using block matching. The motion vector detection circuit 26 determines the motion vector for each block of the current picture provided by the A/D converter 4 to represent the motion between each block of the current picture and the corresponding target block of the prediction picture provided by the frame memory 24.

The motion compensation circuit 25 provides each target block of the prediction picture as a block of the prediction signal S2. The motion compensation circuit also provides, in a coded format, the motion vectors which were used to produce the prediction signal S2. The motion vectors are fed to the multiplexer circuit 17.

In the interframe prediction coding circuit 10 in which the motion vector detector performs block matching, since the motion vector is calculated using only the luminance signal Y, no motion vector is detected for those blocks of the current picture that are at the same luminance level as corresponding blocks of the prediction picture, even when there is movement between the current picture and the prediction picture.

Because of this, the prediction signal S2 is non-optimum, and a large prediction error signal S3 is generated, which increases redundancy in the compressed motion picture signal.

SUMMARY OF THE INVENTION

In view of the foregoing, an object of this invention is to provide a motion vector detection circuit which allows the motion picture signal to be compressed efficiently as a result of optimum motion compensation by enabling a correct motion vector to be detected, even when there is motion of objects of the same luminance level.

The foregoing objects and other objects of the invention have been achieved by the provision of a circuit for calculating motion vectors for use in compressing a motion picture signal. The motion picture signal is divided into portions, each portion representing a picture. The portions include a current portion representing a current picture. The current portion is subdivided into blocks, including a current block. Each block represents a rectangular portion of the current picture, and includes a luminance signal, a first color signal, and a second color signal. The circuit comprises a circuit that derives a prediction picture from the motion picture signal. The circuit also includes a circuit that generates a luminance motion vector, a first color motion vector, and a second color motion vector. The respective motion vectors are generated by performing block matching between the luminance signal, the first color signal, and the second color signal of the current block and signals representing a block of the prediction picture corresponding to the current block. A flatness judgment circuit for judges whether the luminance signal, the first color signal, or the second color signal of the current block is not flat and, when one of the signals is judged to be not flat, identifies the signal determined to be not flat as a flatness judgment result. Finally, a motion vector selecting circuit selects the luminance motion vector, the first chrominance motion vector, or the second chrominance motion vector as the motion vector for the current block in response to the judgment result from the flatness judgment circuit.

The invention also provides a method for calculating motion vectors for use in compressing a motion picture signal. The motion picture signal is divided into portions, each portion representing a picture. The portions include a current portion representing a current picture. The current portion is subdivided into blocks, including a current block. Each block represents a rectangular portion of the current picture, and includes a luminance signal, a first color signal, and a second color signal. In the method, a prediction picture is derived from the motion picture signal. A luminance motion vector, a first color motion vector, and a second color motion vector are generated by performing block matching between the luminance signal, the first color signal, and the second color signal, respectively, of the current block and signals representing a block of the prediction picture corresponding to the current block. It is judged whether the luminance signal of the current block is not flat and, when the luminance signal is judged to be not flat, the luminance motion vector is adopted as the motion vector for the current block. Otherwise, it is judged whether the first color signal of the current block is not flat and, when the first color signal is judged to be not flat, the first color motion vector is adopted as the motion vector for the current block. Otherwise it is judged whether the second color signal of the current block is not flat and, when the second color signal is judged to be not flat, the second color motion vector is adopted as the motion vector for the current block. Otherwise, the luminance motion vector is adopted as the motion vector for the block.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of the invention will be described with reference to the accompanying drawings.

The motion vector detection circuit according to the present invention may be applied to an interframe prediction coding circuit using an orthogonal transform or to an interframe prediction coding circuit using differential PCM (DPCM). Discussed here in this embodiment is an interframe prediction coding circuit using an orthogonal transform.

Figure 1:
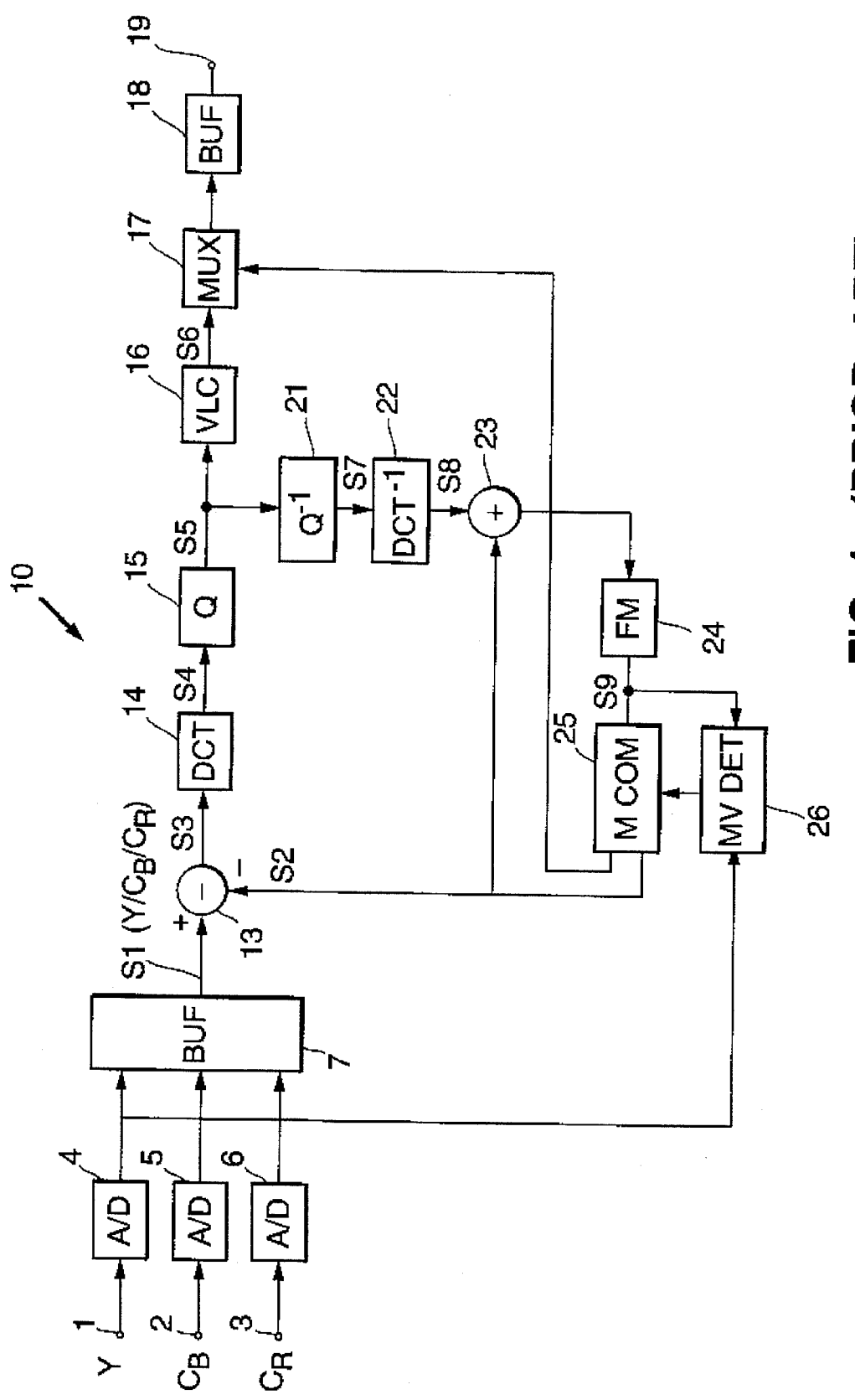
FIG. 1 is a block diagram of an example of a conventional interframe prediction coding circuit.
Figure 2:
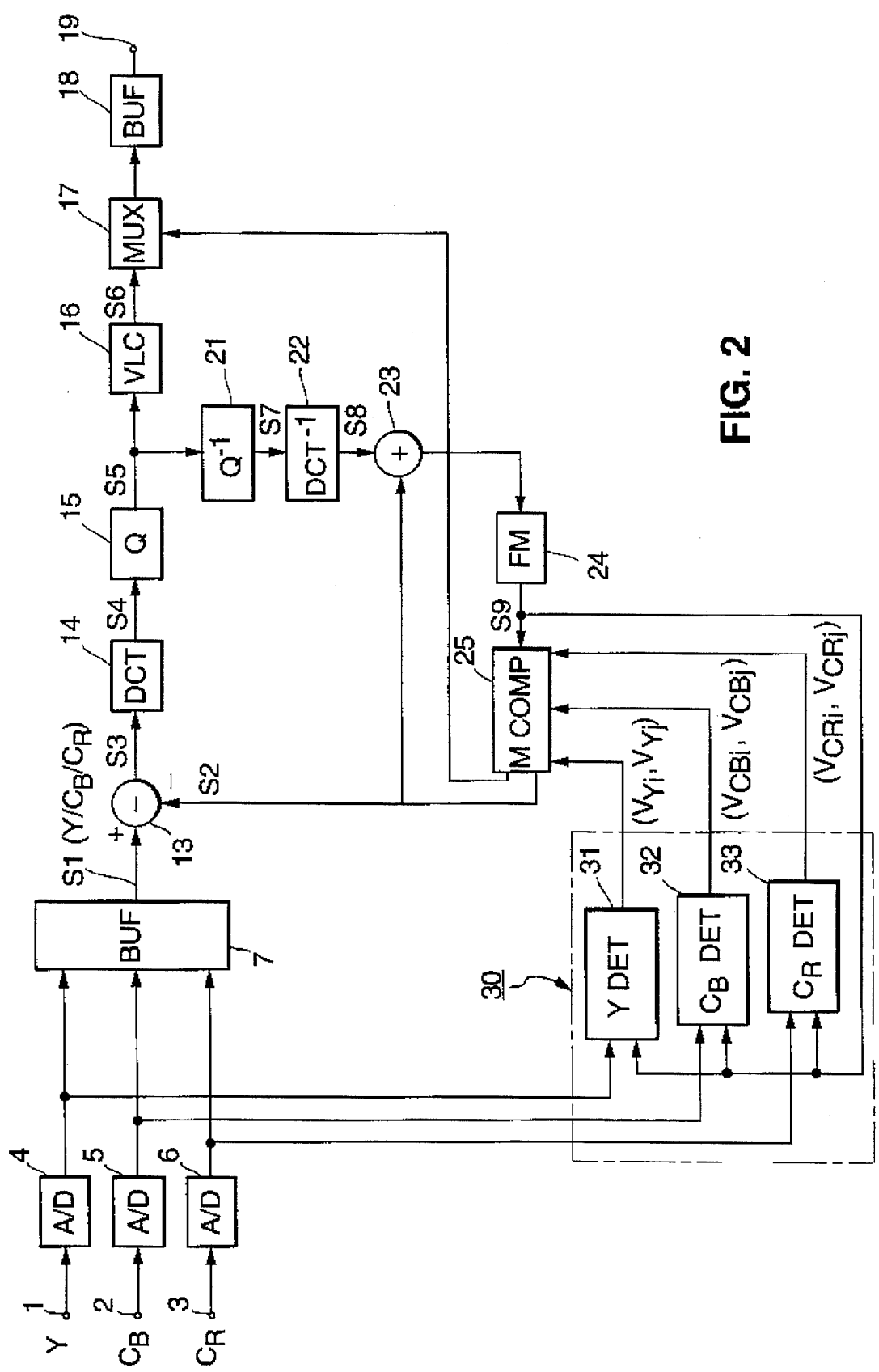
FIG. 2 is a block diagram showing an embodiment of an interframe prediction coding circuit into which a motion vector detection circuit according to the present invention is incorporated.

Since the basic construction of the interframe prediction coding circuit remains unchanged from that shown in FIG. 1, a general description of the circuit will not be repeated here. As shown in FIG. 2, in this embodiment, the motion vector detector 30 not only detects a motion vector using the luminance signal Y, but also detects motion vectors using the color-difference signals $C_B$ and $C_R$.

For this purpose, the color-difference signal motion vector detectors 32 and 33 are provided in addition to the luminance signal motion vector detector 31, as shown in FIG. 2. The luminance signal Y, and the pair of color-difference signals $C_B$ and $C_R$ are respectively supplied to the motion vector detectors 31, 32, and 33. The luminance signal and the color-difference signals, collectively S9, of the prediction picture are also supplied to the motion vector detectors 31, 32, and 33 by the frame memory 24. The motion vectors $(V_{Yi}, V_{Yj})$, $(V_{CBi}, V_{CBj})$ and $(VC_{CRi}, V_{CRj})$ generated by the motion vector detectors 31, 32, and 33 are fed to the motion compensation circuit 25.

The motion compensation circuit 25 performs motion compensation on the prediction picture under the control of a microcomputer (not shown). The motion compensation circuit 25 determines whether the luminance signal and the two color difference signals in the current block are flat, and, from this determination, selects the motion vector of the luminance signal and or one of the motion vectors of the color-difference signals. The motion compensation circuit then performs a series of processes to produce the prediction signal S2 in response to the selected motion vector.

An example of the process by which the motion vector $(M_{Vi}, M_{Vj})$ for the block is selected from the motion vectors generated by the motion vector detectors 31, 32, and 33 will now be described with reference to FIGS. 2 and 3.

Figure 3:
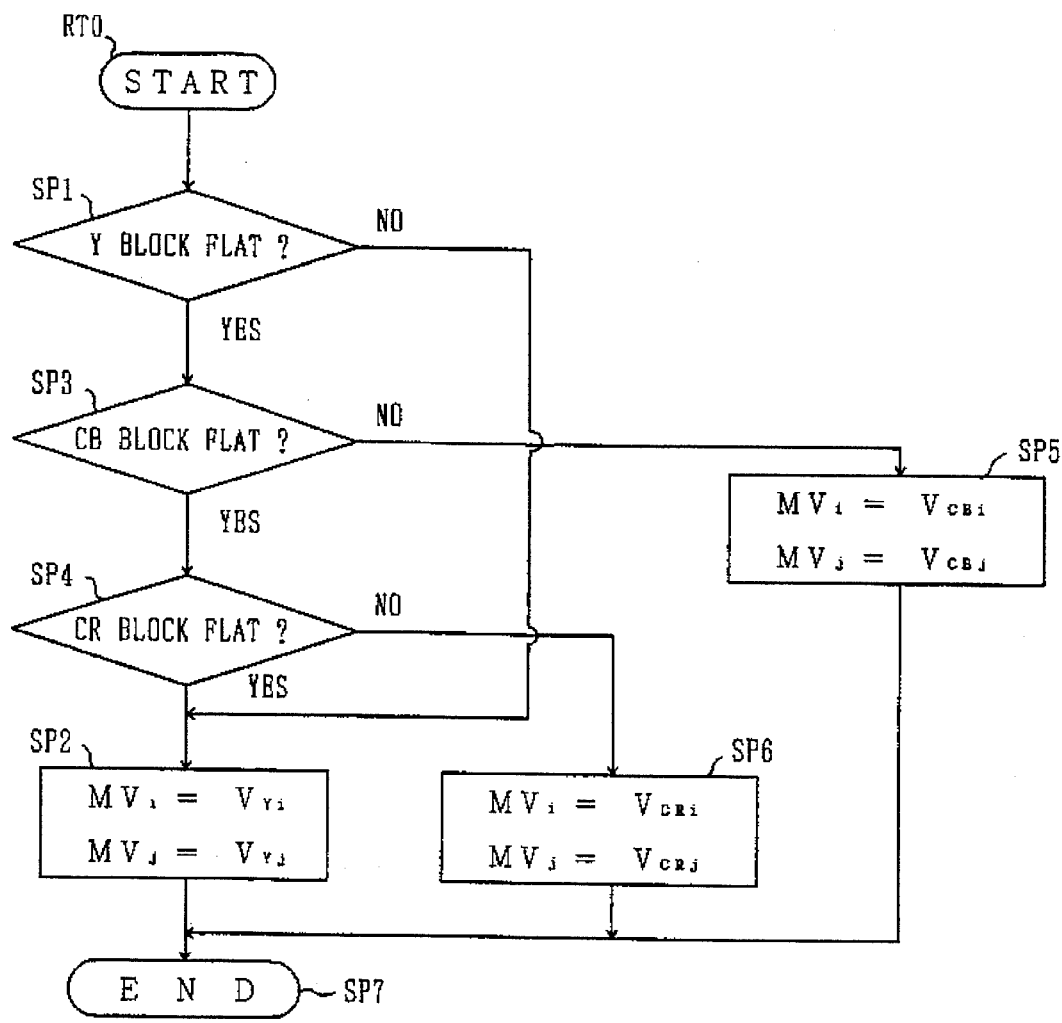
FIG. 3 is a flow chart showing the process for determining the motion vector in the motion vector detection circuit according to the invention.

In the process shown in FIG. 3, the pixel values of the luminance signal Y of the current block are checked for flatness (step SP1). When non-flatness, for example, the existence in the block of any edge, is detected, the motion vector $(V_{Yi}, V_{Yj})$ detected by the luminance signal motion detector 31 is adopted as the motion vector $(M_{Vi}, M_{Vj})$ for the block in the same manner as in a conventional motion vector detection circuit (step SP2).

On the other hand, when it is determined at step SP1 that the luminance signal of the current block is flat, execution passes to step SP3, where the pixel values of the color-difference signal $C_B$ of the current block are checked for flatness. When any non-flatness of the pixel values of the color difference signal $C_B$ in the block is detected, this indicates that an object in the block must have some edge. Execution passes to step SP5, where the motion vector $(V_{CBi}, V_{CBj})$ detected by the motion detector 32, is adopted as the motion vector $(M_{Vi}, M_{Vj})$ for the block.

On the other hand, when it is determined at step SP3 that the color difference signal $C_B$ of the current block is flat, execution passes to step SP4, where the pixel values of the color-difference signal $C_R$ of the current block are checked for flatness. When any non-flatness of the pixel values of the color difference signal $C_R$ in the block is detected, this indicates that an object in the block must have some edge. Execution passes to step SP6, where the motion vector $(V_{CRi}, V_{CRj})$ detected by the motion detector 33 is adopted as the motion vector $(M_{Vi}, M_{Vj})$ for the block.

When it is determined at step SP4 that the color difference signal $C_R$ of the current block is flat, this indicates that no edges exist in the current block. Execution passes to step SP2, where the motion vector $(V_{Yi}, V_{Yj})$ detected by the luminance signal motion vector detector 31 is adopted as the motion vector $(M_{Vi}, M_{Vj})$ of the block.

In this embodiment, the detection of the color-difference block $C_B$ has priority over the detection of the color-difference block $C_R$. Alternatively, this priority may be reversed by reversing the order of steps SP3 and SP4.

The motion compensator 25 then generates the prediction signal SP2 for the current block using the selected motion vector $(M_{Vi}, M_{Vj})$ for the block. In addition, the motion compensator codes the motion vector and feeds the coded motion vector to the multiplexer circuit 17.

Figure 4:
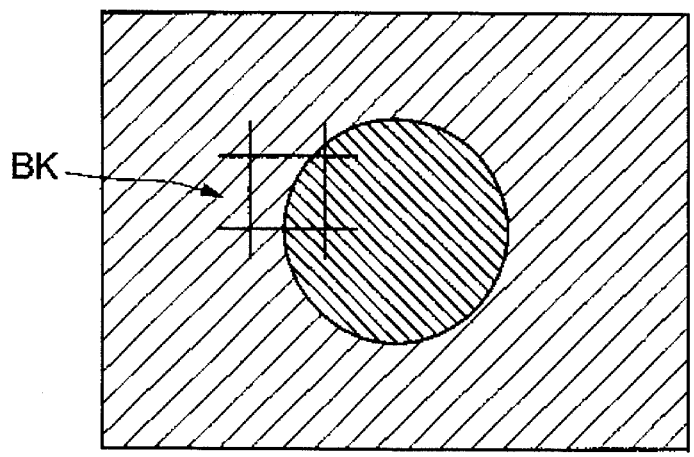
FIG. 4 illustrates an object in a picture.
Figure 5:
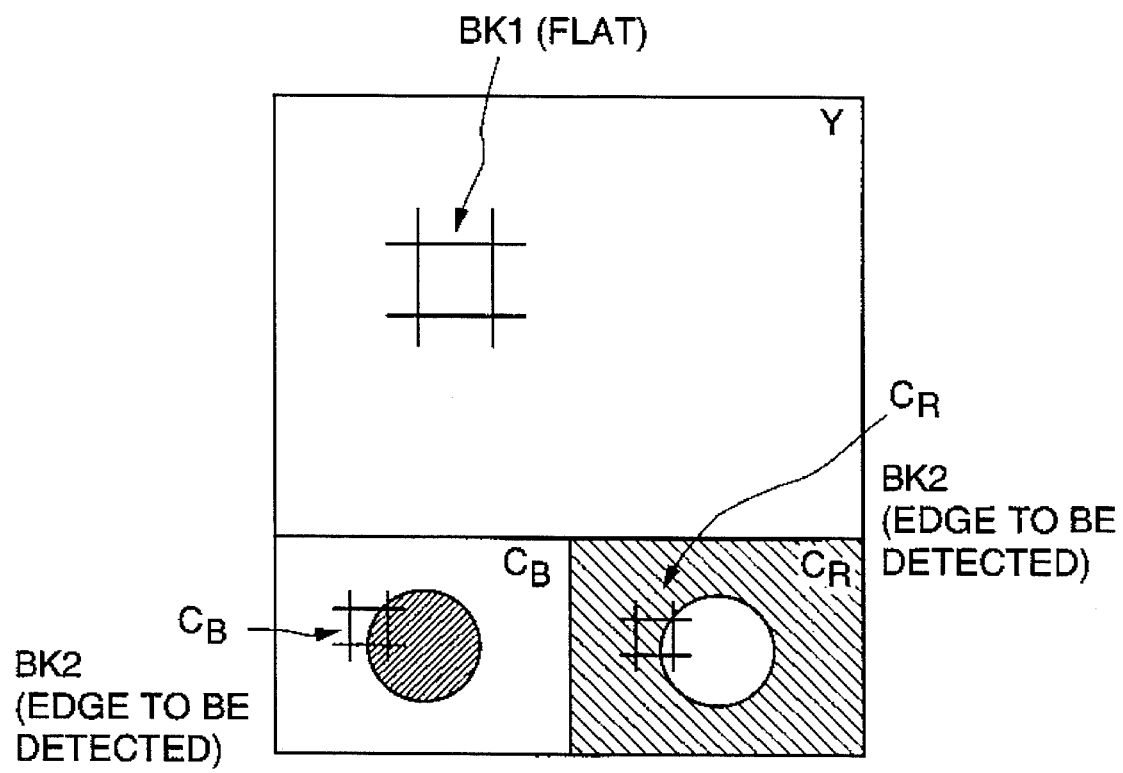
FIG. 5 illustrates how the motion vector is determined by using the luminance signal block and the color-difference signal blocks.

The operation of the motion vector detection circuit 30 will now be described in more detail with reference to FIGS. 2, 4, and 5. For example, when the block BK shown in FIG. 4 includes, e.g., part of a circular object that has the same luminance level as its background, the pixel values of the block BK1 of the luminance signal Y of the block BK are the same throughout the block BK1, as shown in FIG. 5. Hence, the luminance signal motion detector 31 is unable to determine a useful motion vector, because the results of matching the block BK1 to the corresponding block of the prediction picture displaced by all allowable values of the motion vector will all be the same.

The pixel values in the blocks BK2 of the color difference signals $C_B$ and $C_R$ of the block BK, and corresponding to the block BK1 of the luminance signal Y, change in the blocks, as shown in FIG. 5. Hence the motion vector detectors 32 and 33 are both able to detect an edge, and the motion vector $(M_{Vi}, M_{Vj})$ for the block may be obtained from the motion vectors determined for the color difference signals $C_B$ and $C_R$. The motion vector thus obtained may then be used to determine the prediction signal S2.

The motion compensator 25 determines whether the current block is flat as follows: the maximum and the minimum of the values of the pixels in the block are determined, and the difference between the maximum and minimum values is calculated. The block is then deemed to be flat when the difference is smaller than a predetermined threshold value.

In the above embodiment, the three motion vectors are determined from the components Y, $C_B$, and $C_R$ of the motion picture signal. Alternatively, the primary signal components R, G, and B, or the signal components Y, I, and Q may be used.

The following alternative methods of determining whether the current block is flat may be used:

(A) the block is judged to be flat when the variance or the standard deviation of the values of the pixels in the block is below a predetermined threshold value.

(B) the block is judged to be flat when the difference between the average of the values of the pixels in the block and the maximum value or the minimum value of the pixels in the block is less than a predetermined threshold value.

Although illustrative embodiments of the invention have been described herein in detail, it is to be understood that the invention is not limited to the precise embodiments described, and that various modifications may be practiced within the scope of the invention defined by the appended claims.

What is claimed is:

1. A circuit for calculating motion vectors for use in compressing a motion picture signal, the motion picture signal being divided into portions, each portion representing a picture, each portion being subdivided into blocks, each block representing a rectangular portion of the picture, and including a luminance signal, a first color signal, and a second color signal, the circuit comprising:

means for deriving a prediction picture from the motion picture signal; and motion vector generating means for generating a motion vector for each block, the motion vector generating means including:

means for generating a luminance motion vector for the block by performing block matching between the luminance signal of the block and of the prediction picture, the luminance motion vector representing magnitude and direction of motion between the block and a luminance matching block of the prediction picture, the luminance matching block including a luminance signal component matching the luminance signal of the block, the luminance signal component having a dynamic range, means for generating a first color motion vector for the block by performing block matching between the first color signal of the block and the prediction picture, the first color motion vector representing magnitude and direction of motion between the block and a first color matching block of the prediction picture, the first color matching block including a first color signal component matching the first color signal of the block, the first color signal component having a dynamic range, means for generating a second color motion vector for the block by performing block matching between the second color signal of the block and the prediction picture, the second color motion vector representing magnitude and direction of motion between the block and a second color matching block of the prediction picture, the second color matching block including a second color signal component matching the second color signal of the block, the second color component having a dynamic range, flatness judgment means for judging, in a sequence, whether the luminance signal component of the luminance matching block is not flat by determining when the dynamic range of the luminance component is above a luminance threshold level, the first color signal of the first color matching block is not flat by determining when the dynamic range of the first color component is above a first color threshold level, and the second color signal of the second color matching block is not flat by determining whether the dynamic range of the second color component is above a second color threshold level, the flatness judgment means identifying a first one of the luminance signal component, the first color signal component, and the second color signal component in the sequence judged to be not flat as a flatness judgment result, and motion vector selecting means for selecting one of the luminance motion vector, the first color motion vector, and the second color motion vector as the motion vector for the block in response to the judgment result from the flatness judgment means.

2. The circuit of claim 1, wherein:

the flatness judgment means is for first judging whether the luminance signal component is not flat, and, when the luminance signal component is determined to be not flat, for identifying the luminance signal component as the flatness judgment result; and in response to the flatness judgment result identifying the luminance signal component, the motion vector selecting means selects the luminance motion vector as the motion vector for the block.

3. The circuit of claim 1, wherein:

the flatness judgment means is first for judging whether the luminance signal component is not flat, and, when the luminance signal component is judged to be flat, for judging whether the first color signal component is not flat, and, when the first color signal component is judged to be not flat, for identifying the first color signal component as the flatness judgment result; and in response to the flatness judgment result identifying the first color signal component, the motion vector selecting means selects the first color motion vector as the motion vector for the block.

4. The circuit of claim 1, wherein:

the flatness judgment means is additionally for identifying the luminance signal component as the flatness judgment result when the flatness judgment means judges the luminance signal component and both color signal components to be flat; and in response to the flatness judgment result identifying the luminance signal component, the motion vector selecting means selects the luminance motion vector as the motion vector for the block.

5. The circuit of claim 1, additionally comprising means for generating, from the prediction picture, a prediction signal for the block in response to the motion vector for the block.

6. The circuit of claim 1, wherein:

the flatness judgment means is first for judging whether the luminance signal component is not flat, and, when the luminance signal component is judged to be flat, for judging whether the first color signal component is not flat, and, when the first color signal component is judged to be flat, for judging whether the second color signal component is not flat, and, when the second color signal component is judged to be not flat, for identifying the second color signal component as the flatness judgment result; and in response to the flatness judgment result identifying the second color signal component, the motion vector selecting means selects the second color motion vector as the motion vector for the block.

7. The circuit of claim 1, wherein:

the luminance signal component, the first color signal component, and the second color signal component each include plural pixel values; and the flatness judgment means includes means includes:

means for receiving one of the luminance signal component, the first color signal component, and the second color signal component as a received signal, means for determining from the pixel values of the received signal a maximum pixel value and a minimum pixel value, means for subtracting the minimum pixel value and the maximum pixel value to provide a difference, means for comparing the difference with a respective one of the luminance threshold value, the first color threshold value, and the second color threshold value to provide a comparison result, and means for providing the flatness judgment result when the comparison result indicates that the difference is greater than the threshold value.

8. The circuit of claim 1, wherein:

the luminance signal component, the first color signal component, and the second color signal component each include plural pixel values; and the flatness judgment means includes means includes:

means for receiving one of the luminance signal component, the first color signal component, and the second color signal component as a received signal, means for determining one of a maximum pixel value and a minimum pixel value from the pixel values of the received signal, means for determining an average pixel value from the pixel values of the received signal, means for subtracting the one of the minimum pixel value and the maximum pixel value from the average pixel value to provide a difference, means for comparing the difference with a respective one of the luminance threshold value, the first color threshold value, and the second color threshold value to provide a comparison result, and means for providing the flatness judgment result when the comparison result indicates that the difference is greater than the threshold value.

9. A method for deriving from a motion picture signal a motion vector for a current block of a current picture represented by a current portion of the motion picture signal, the motion vector being for use in compressing the motion picture signal, the motion picture signal being divided into portions, each portion representing a picture, each portion being subdivided into blocks, each block representing a rectangular portion of the picture, and including a luminance signal, a first color signal, and a second color signal, the method comprising the steps of:

deriving a prediction picture from the motion picture signal; and generating a motion vector for each block, including:

generating a luminance motion vector for the block by performing block matching between the luminance signal of the block and luminance signal components of blocks of the prediction picture, the luminance motion vector representing magnitude and direction of motion between the current block and a luminance matching block of the prediction picture, the luminance matching block including a luminance signal component matching the luminance signal of the block, the luminance signal component having a dynamic range, generating a first color motion vector for the block by performing block matching between the first color signal of the block and first color signal components of blocks of the prediction picture, the first color motion vector representing magnitude and direction of motion between the block and a first color matching block of the prediction picture, the first color matching block including a first color signal component matching the first color signal of the block, the first color signal component having a dynamic range generating a second color motion vector for the block by performing block matching between the second color signal of the block and second color signal components of blocks of the prediction picture, the second color motion vector representing magnitude and direction of motion between the current block and a second color matching block of the prediction picture, the second color matching block including a second color signal component matching the second color signal of the block, the second color signal component having a dynamic range judging whether the luminance signal component of the luminance matching block is not flat by determining when the dynamic range of the luminance signal component is above a luminance threshold value and, when the luminance signal component of the luminance matching block is judged to be not flat, adopting the luminance motion vector as the motion vector for the block, and otherwise:

judging whether the first color signal component of the first color signal matching block is not flat by determining when the dynamic range of the first color signal component is above a first color threshold value and, when the first color signal of the first color signal matching block is judged to be not flat, adopting the first color motion vector as the motion vector for the block, and otherwise:

judging whether the second color signal component of the block is not flat by determining when the dynamic range of the second color signal component is above a second color threshold value and, when the second color signal component of the block is judged to be not flat, adopting the second color motion vector as the motion vector for the block, and otherwise:

adopting the luminance motion vector as the motion vector for the block.

10. The method of claim 9, additionally comprising the step of generating, from the prediction picture, a prediction signal for the block in response to the motion vector for the block.

11. The circuit of claim 9, wherein:

the luminance signal component of the luminance signal matching block, the first color signal component of the first color signal matching block, and the second color signal component of the second color signal matching block each include plural pixel values;

the step of judging whether the luminance signal component of the luminance signal matching block is not flat includes the steps of:

determining a maximum luminance pixel value and a minimum luminance pixel value from the pixel values of the luminance signal component of the luminance signal matching block, subtracting the minimum luminance pixel value and the maximum luminance pixel value to provide a luminance difference, comparing the difference with a luminance threshold value to provide a luminance comparison result, and adopting the luminance motion vector as the motion vector for the block when the luminance comparison result indicates that the luminance difference is greater than the luminance threshold value;

the step of judging whether the first color signal component of the first color signal matching block is not flat includes the steps of:

determining a maximum first color pixel value and a minimum first color pixel value from the pixel values of the first color signal component of the first color signal matching block, subtracting the minimum first color pixel value and the maximum first color pixel value to provide a first color difference, comparing the first color difference with a first color threshold value to provide a first color comparison result, and adopting the first color motion vector as the motion vector for the block when the first color comparison result indicates that the first color difference is greater than the first color threshold value; and the step of judging whether the second color signal component of the second color signal matching block is not flat includes the steps of:

determining a maximum second color pixel value and a minimum second color pixel value from the pixel values of the second color signal of the second color signal matching block, subtracting the minimum second color pixel value and the maximum second color pixel value to provide a second color difference, comparing the second color difference with a second color threshold value to provide a second color comparison result, and adopting the second color motion vector as the motion vector for the block when the second color comparison result indicates that the second color difference is greater than the second color threshold value.

12. The method of claim 9, wherein:

the luminance signal component of the luminance signal matching block, the first color signal component of the first color signal matching block, and the second color signal component of the second color signal matching block each include plural pixel values;

the step of judging whether the luminance signal component of the luminance signal matching block is not flat includes the steps of:

determining one of a maximum luminance pixel value and a minimum luminance pixel value from the pixel values of the luminance signal component of the luminance signal matching block, determining an average luminance pixel value from the pixel values in the luminance signal component of the luminance signal component matching block, subtracting the one of the minimum luminance pixel value and the maximum luminance pixel value from the average luminance pixel value to provide a luminance difference value, comparing the luminance difference value with a luminance threshold value to provide a luminance comparison result, and adopting the luminance motion vector as the motion vector for the block when the luminance comparison result indicates that the luminance difference value is greater than the luminance threshold value;

the step of judging whether the first color signal component of the first color signal matching block is not flat includes the steps of:

determining one of a maximum first color pixel value and a minimum first color pixel value from the pixel values of the first color signal component of the first color signal matching block, determining an average first color pixel value from the pixel values in the first color signal component of the first color signal block, subtracting the one of the minimum first color pixel value and the maximum first color pixel value from the average first color pixel value to provide a first color difference value, comparing the first color difference value with a first color threshold value to provide a first color comparison result, and adopting the first color motion vector as the motion vector for the block when the first color comparison result indicates that the first color difference value is greater than the first color threshold value; and the step of judging whether the second color signal component of the second color signal matching block is not flat includes the steps of:

determining one of a maximum second color pixel value and a minimum second color pixel value from the pixel values of the second color signal component of the second color signal matching block, determining an average second color pixel value from the pixel values in the second color signal component of the second color signal matching block, subtracting the one of the minimum second color pixel value and the maximum second color pixel value from the average second color pixel value to provide a second color difference value, comparing the second color difference value with a second color threshold value to provide a second color comparison result, and adopting the second color motion vector as the motion vector for the block when the second color comparison result indicates that the second color difference value is greater than the second color threshold value.

\* \* \* \* \*